US007663866B2

(12) United States Patent
Lee et al.

(10) Patent No.: US 7,663,866 B2
(45) Date of Patent: Feb. 16, 2010

(54) REMOTE CONTROL DUO POWER SET

(75) Inventors: Yu-Lung Lee, Nanjhuang Township (TW); Ming-Chou Kuo, Taipei (TW)

(73) Assignee: Powertech Industrial Co., Ltd., Chung Ho (TW)

( * ) Notice: Subject to any disclaimer, the term of this patent is extended or adjusted under 35 U.S.C. 154(b) by 0 days.

(21) Appl. No.: 12/082,159

(22) Filed: Apr. 9, 2008

(65) Prior Publication Data

US 2009/0195970 A1 Aug. 6, 2009

(30) Foreign Application Priority Data

Feb. 5, 2008 (TW) .............................. 97104495 A

(51) Int. Cl.
*H02J 3/00* (2006.01)

(52) U.S. Cl. ....................... 361/601; 361/622; 361/625; 361/628; 361/641; 307/38; 307/117

(58) Field of Classification Search ................ 361/93.1, 361/166, 600–612, 622, 626, 631, 641, 88; 307/31, 11, 36, 42, 29, 147, 18, 38, 40, 115, 307/117; 340/310.08, 310.01, 310.07, 635; 439/367–369, 460, 501, 731, 715, 717, 723, 439/724, 650, 653, 639
See application file for complete search history.

(56) References Cited

U.S. PATENT DOCUMENTS

| | | | | |
|---|---|---|---|---|
| 5,236,374 | A * | 8/1993 | Leonard et al. | 439/505 |
| 5,424,903 | A * | 6/1995 | Schreiber | 361/166 |
| 5,700,150 | A * | 12/1997 | Morin | 439/4 |
| D411,169 | S * | 6/1999 | West | D13/139.8 |
| 6,211,581 | B1 * | 4/2001 | Farrant | 307/117 |
| 6,271,502 | B1 * | 8/2001 | Lee | 219/391 |
| 6,410,994 | B1 * | 6/2002 | Jones et al. | 307/36 |
| 6,445,087 | B1 * | 9/2002 | Wang et al. | 307/40 |
| 6,573,617 | B2 * | 6/2003 | Jones et al. | 307/36 |
| 6,586,849 | B2 * | 7/2003 | Tarr | 307/38 |
| 6,633,472 | B2 * | 10/2003 | Lai | 361/93.1 |
| 6,666,712 | B1 * | 12/2003 | Kramer | 439/501 |
| 6,734,579 | B1 * | 5/2004 | Cox | 307/38 |
| 6,744,150 | B2 * | 6/2004 | Rendic | 307/38 |
| 6,780,048 | B2 * | 8/2004 | Chen et al. | 439/502 |
| 6,956,464 | B2 * | 10/2005 | Wang et al. | 375/258 |
| D518,780 | S * | 4/2006 | Chang | D13/137.3 |
| 7,074,091 | B2 * | 7/2006 | Strayer | 439/652 |
| 7,132,763 | B2 * | 11/2006 | Rendic | 307/31 |
| 7,141,891 | B2 * | 11/2006 | McNally et al. | 307/39 |

(Continued)

*Primary Examiner*—Michael V Datskovskiy
(74) *Attorney, Agent, or Firm*—C. G. Mersereau; Nikolai & Mersereau, P.A.

(57) ABSTRACT

A remote control duo power set comprises one first power outlet which has one first housing, a plurality of first sockets being set on one surface of said first housing, a power cord extending from one side of said first housing; one connecting cord of which one end is connected to the other side of said first housing; and one second power outlet, which is connected to the other side of said connecting cord and has one second housing, a plurality of second sockets and at least one power switch being provided at a side of the second housing. User can easily supply power to the electronic devices by said second power outlet. Furthermore, users can also easily control the supply of power by said power switch.

9 Claims, 10 Drawing Sheets

U.S. PATENT DOCUMENTS

| | | | | |
|---|---|---|---|---|
| 7,210,960 | B2 * | 5/2007 | Mak et al. | 439/505 |
| 7,239,892 | B2 * | 7/2007 | Martin | 455/557 |
| D549,654 | S * | 8/2007 | Kent et al. | D13/139.6 |

* cited by examiner

REMOTE CONTROL DUO POWER SET

BACKGROUND OF THE INVENTION

1. Field of the Invention

This invention relates to a power set and particularly to a remote control duo power set.

2. Description of Related Art

Because of innovation in the electronic sector as well as increasing consumer spending power, more and more electronic devices are used at each household, and each electronic device must be connected to an ac power outlet to operate. However, the amount of stationary wall sockets is limited, so that many consumers use a multi-socket power outlet to increase the number of available electric power terminals.

Generally, a user places the power outlet on the ground under a table and then plugs power cords of electronic devices around the table's top into sockets of the power outlet. Thus, the amount and disorder of power cords on the table may be reduced and the user does not casually pull and drag the power cords of electronic devices, causing the power of electronic devices from being cut and the products from being damaged when falling off.

However, a portable electronic devices, such as a mobile phone, a digital still camera (DSC), a walkman, an electric shaver and the like that need charging trouble the user to plug the power cord into or pull the power cord from the power outlet under the table. Every time, the user must stoop to plug or pull the plug, which is inconvenient.

Besides, the power outlet is generally provided with a power switch for the user to control the power outlet supplying the power. Likewise, the user must stoop to control the power switch, which is also inconvenient.

Consequently, because of the technical defects of described above, the applicant keeps on carving unflaggingly through wholehearted experience and research to develop the present invention, which can effectively improve the defects described above.

SUMMARY OF THE INVENTION

In this invention, it is mainly to provide a remote control duo power set. A user may easily supply power to an electronic device and also control the supply of power.

In order to achieve the object mentioned above, the remote control duo power set according to this invention comprises a first power outlet which has a first housing, a surface of which is formed with a plurality of first sockets, in which a power cord extends from one of two ends of the first housing and a power plug is provided at an end of the power cord; a connecting cord, an end of which is connected to the other side of the first housing; and a second power outlet connected to the other end of the connecting cord, in which the second power outlet has a second housing, a surface of which is formed with a plurality of second sockets and at least one power switch.

In this invention, advantageously, the second power outlet is placed on a table and the user may easily use the outlet to supply power to electronic devices, the power cords of which are frequently plugged and pulled. With the power switch provided on the second power outlet, the supply of power may be easily controlled.

In order to further know the features and technical means of this invention, refer to the detailed description according to this invention accompanied with drawings; however, the accompanied drawings are provided for reference and illustration only and are not limited to this invention.

DETAILED DESCRIPTION OF THE PREFERRED EMBODIMENTS

Below, the present invention will be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
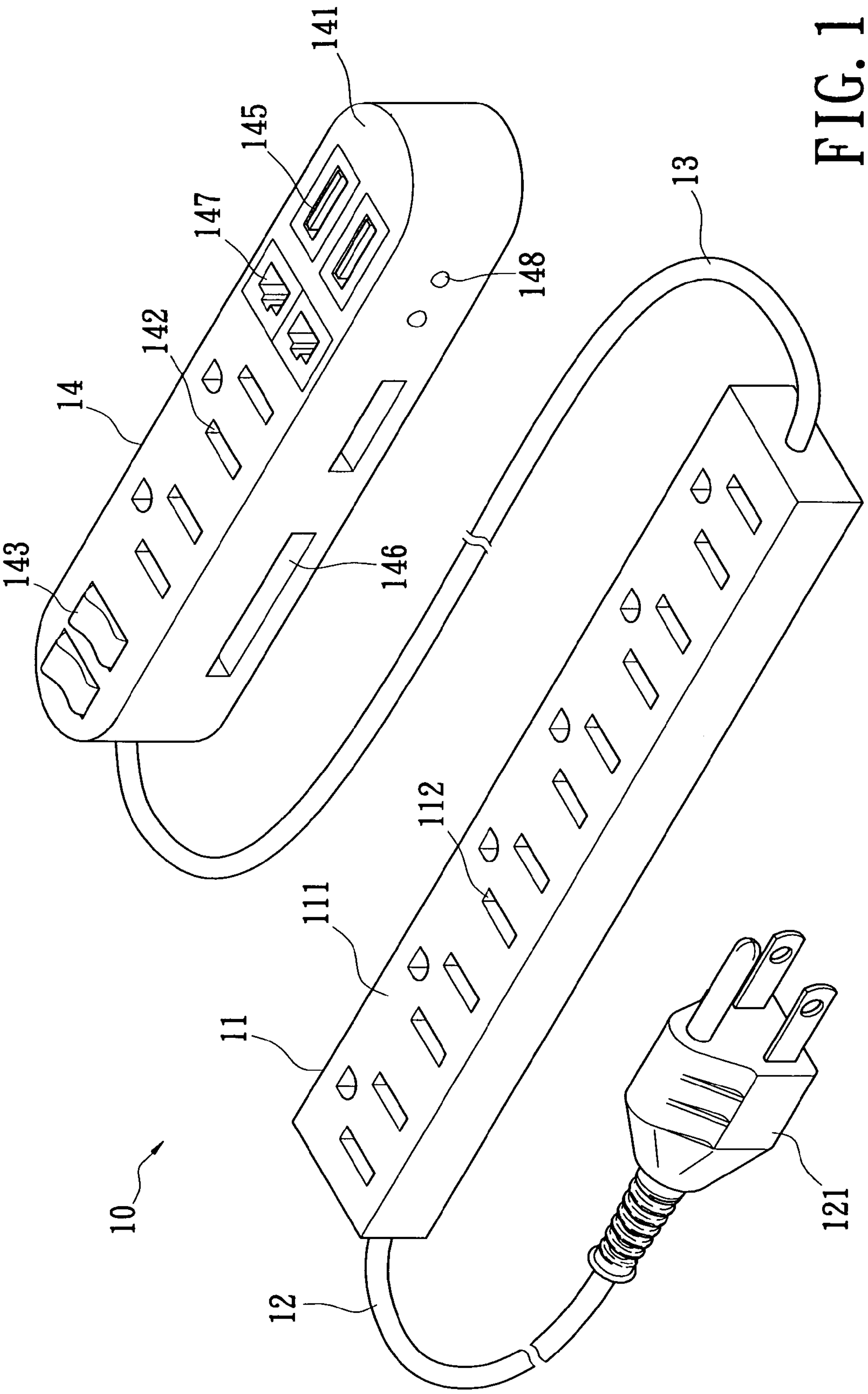
FIG. 1 is a 3D view of a remote control duo power set in a first embodiment of this invention.

With reference to FIG. 1, a remote control duo power set 10 according to this invention comprises a first power outlet 11, a power cord 12, a connecting cord 13, and a second power outlet 14.

The first power outlet 11 is provided with a first housing 111 inside which an accommodation space is provided for an electronic component. At the top of first housing 111, a plurality of first sockets 112 as those of the prior art are provided with a metal housing fragment, where the power plug of the electronic device may be inserted, thereby establishing an electrical connection. The first socket 112 may be a socket of a two-hole type, three-hole type or the like but not limited, and mainly designed according to a form of power plug in common use; in this embodiment, the socket is a three-hole socket.

A power cord 12 extends from one of two ends of the first housing 111, and a power plug 121 is provided at an end of the power cord 12. The power plug 121 may be plugged into a socket of a general ac power outlet and electrically connected to the socket to receive power supplied.

The other end of the first housing 111 is connected to a connecting cord 13, the other end of which is connected to a second power outlet 14. The connecting cord 13 electrically connects the first power outlet 11 to the second power outlet 14. In the manner of coupling, the power and the control signal are transmitted from a line to the second power outlet 14, or the connecting cord 13 is divided into a power transmission line and a signal transmission line to respectively transmit the power and the control signal.

The structure of second power outlet 14 is similar to that of first power outlet 11, being provided with a second housing 141 inside which some electronic components are installed. Then, a plurality of second sockets 142 are provided on the top surface of second housing 141 for the power plugs of other electronic devices to be inserted into.

At least one power switch 143 is provided at a surface of the second housing 141 to control the first socket 112 or second socket 142 supplying power. In the embodiment, there are two types of power switches 143 that respectively control the first socket 112 and second socket 142 supplying power.

Figure 2:
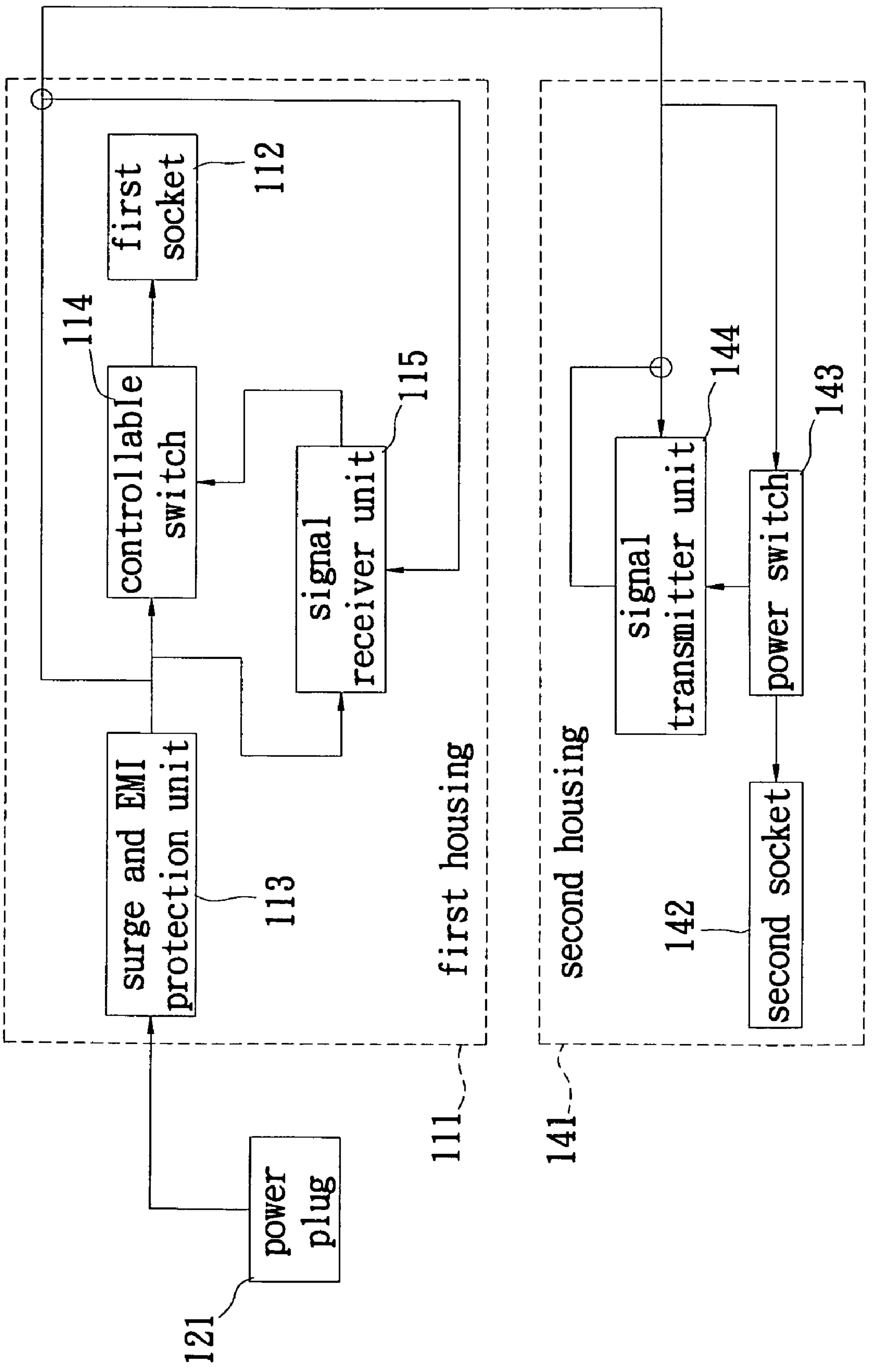
FIG. 2 is a circuit diagram of the remote control duo power set in the first embodiment of this invention.

With reference to FIG. 2 illustrating a circuit of remote control duo power set 10 according to this invention, the first housing 111 of first power outlet 11 is provided with a surge and EMI protection unit 113, a controllable switch 114, and a signal receiver unit 115, while the second housing 141 of second power outlet 14 is provided with a signal transmitter unit 144.

The power plug 121 is inserted into the ac power outlet and then the power is transmitted from the power plug 121 to the first housing 111 through the power line 12. One terminal of the power line 12 is electrically connected to an input terminal of the surge and EMI protection unit 113, and the surge and EMI protection unit through which the power passes may protect the rests of electronic components against the surge voltage and filter the EMI.

The controllable switch 114 is a relay or a TRIAC as an electrically controllable ac switch, one terminal of which is electrically connected to the surge and EMI protection unit 113 and the other terminal of which is electrically connected to the first socket 112. The controllable switch 114 has two states, Closed and Open. When the controllable switch 114 is open, the power cannot be transmitted to the first socket 112; when the switch 114 is closed, the power may be transmitted to the first socket 112.

The signal receiver unit 115 is electrically connected to an output terminal of the surge and EMI protection unit 113, and then the power is transmitted thereinto as the working power of signal receiver unit 115. The signal receiver unit 115 is further electrically connected to the controllable switch 114 and thus may transmit a driving signal to control the operation state of controllable switch 114.

One end of the connecting cord 13 is electrically connected to the surge and EMI protection unit 113 and the signal receiver unit 115, while the other end is electrically connected to the power switch 143 of second housing 141 and the signal transmitter unit 144.

In the embodiment, there are two types of power switches 143, in which one of the power switches 143 is electrically connected to the second socket 142 to control the power being transmitted to the second socket 142. The other power switch 143 is electrically connected to the signal transmitter unit 144 and then the power switch 143 generates a triggering signal and transmits it to the signal transmitter unit 144. The triggering signal drives the signal transmitter unit 144 to further transmit a control signal and then transmit back to the signal receiver unit 115 through the connecting cord 13. Then, depending on information on the control signal, the signal receiver unit 115 determines to open or close the controllable switch 114. Besides, the working power of signal transmitter unit 144 is also transmitted through the connecting cord 13.

Figure 3:
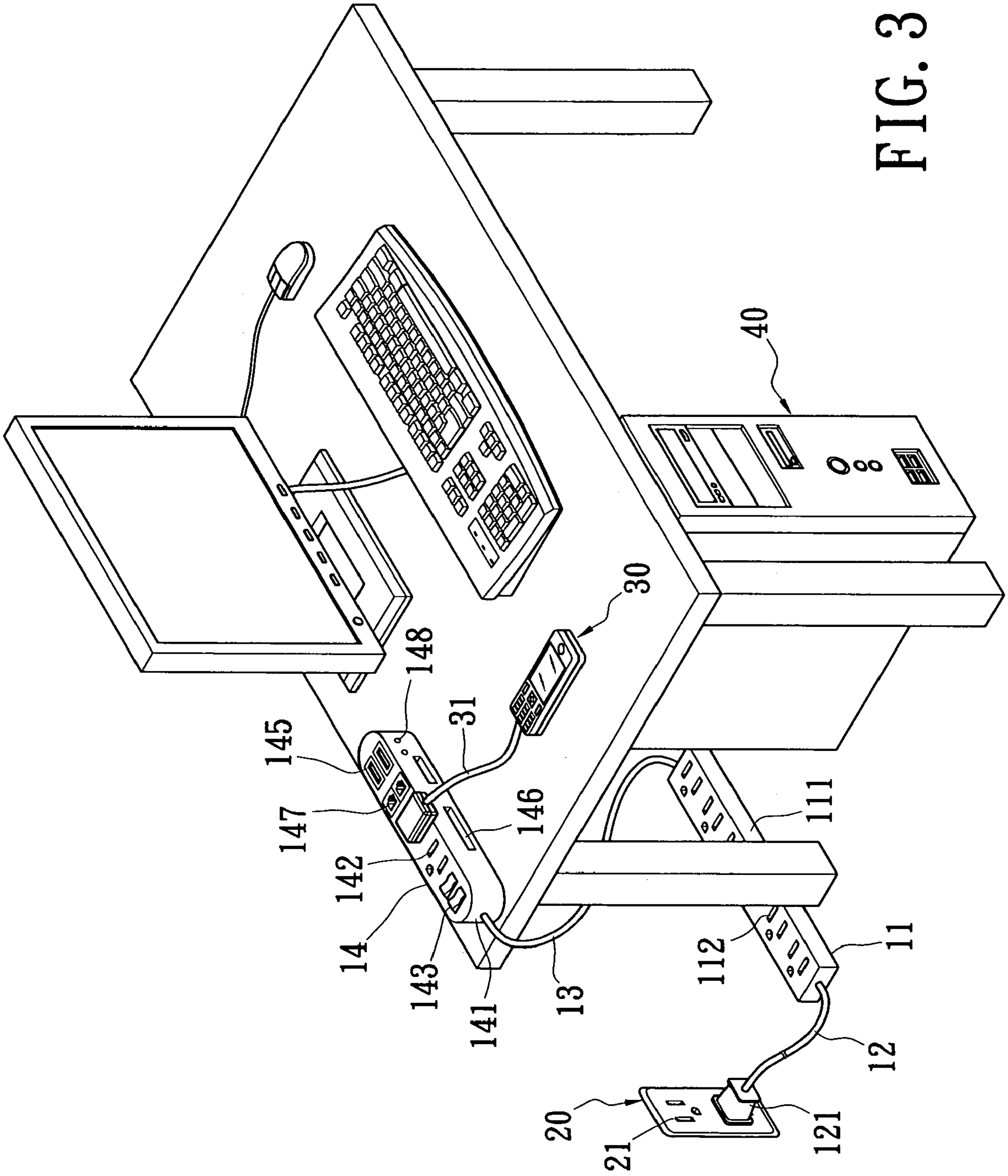
FIG. 3 is a schematic view illustrating the operation state of remote control duo power set in the first embodiment of this invention.

With reference to FIG. 3 illustrating the operation state of remote control duo power set according to this invention, the first power outlet 11 is placed on the ground under a table. The power plug 121 of power cord 12 is plugged into the socket 21 of a stationary wall outlet 20, and then the power cords of parts of electronic devices, such as a host PC 40 may be plugged into the first socket 112. The second power outlet 14 is placed on the table, and the second socket 142 may make the user easily plug or pull the power cords of electronic devices, such as a mobile phone, a camera, shaver and the like. Then, the power switch 143 may also make the user easily control the first socket 112 or second socket 142 supplying the power.

Further, the power switch 143 of second power outlet 14 may be set to be a single power switch 143 (not shown). When the power switch 143 stays open, the first socket 112 and the second socket 142 may supply power. When the power switch 143 stays closed, the first socket 112 cannot supply power but the second socket 142 may still supply power.

The power switch 143 even may designed into a multi-state switch (not shown). A first operation state shows fully open power supply, and the first socket 112 and the second socket 142 may supply power. At s second state, the power supply of the first socket 112 is closed and only the second socket 142 may supply power. At s third state, the power supply of the first socket 142 is closed and only the first socket 112 may supply power. At a fourth state, the first socket 112 and the second socket 142 cannot supply power.

Next, the second power outlet 14 may be expanded by adding other functions, including what is described below.

1. At a side of the second housing 141, a plurality of Universal Serial Bus (USB) slots 145 and may connect with a host PC 40 through a USB cable so that the host PC 40 and the second power outlet 14 may be electrically connected to each other and transmit signals and data to each other.

Currently, for more and more small electronic devices, the USB cable is used as a power transmission line so that the electronic devices may also obtain power directly through the USB slot 145 but not the host PC 40.

2. A card reader is provided in the second housing 141 and a plurality of memory card slots 146 are provided on the surface of second housing 141 to be electrically connected to the card reader so that the user may insert into the memory card slot 146 the memory card for a DSC and the like as the electronic devices, in which files are read from the memory card through the card reader and then transmitted to the host PC 40.

3. A hub is provided in the second housing 141 and then a plurality of network line jacks 147 are provided on the surface of second housing 141 to be connected to the hub so that the plurality of network lines may be inserted into the network line jacks 147.

A plurality of display lamps 148 may further be provided on the surface of second housing 141 to display the operation state of remote control duo power set 10; for example, the power is supplied by the first socket 112 or not.

Figure 4:
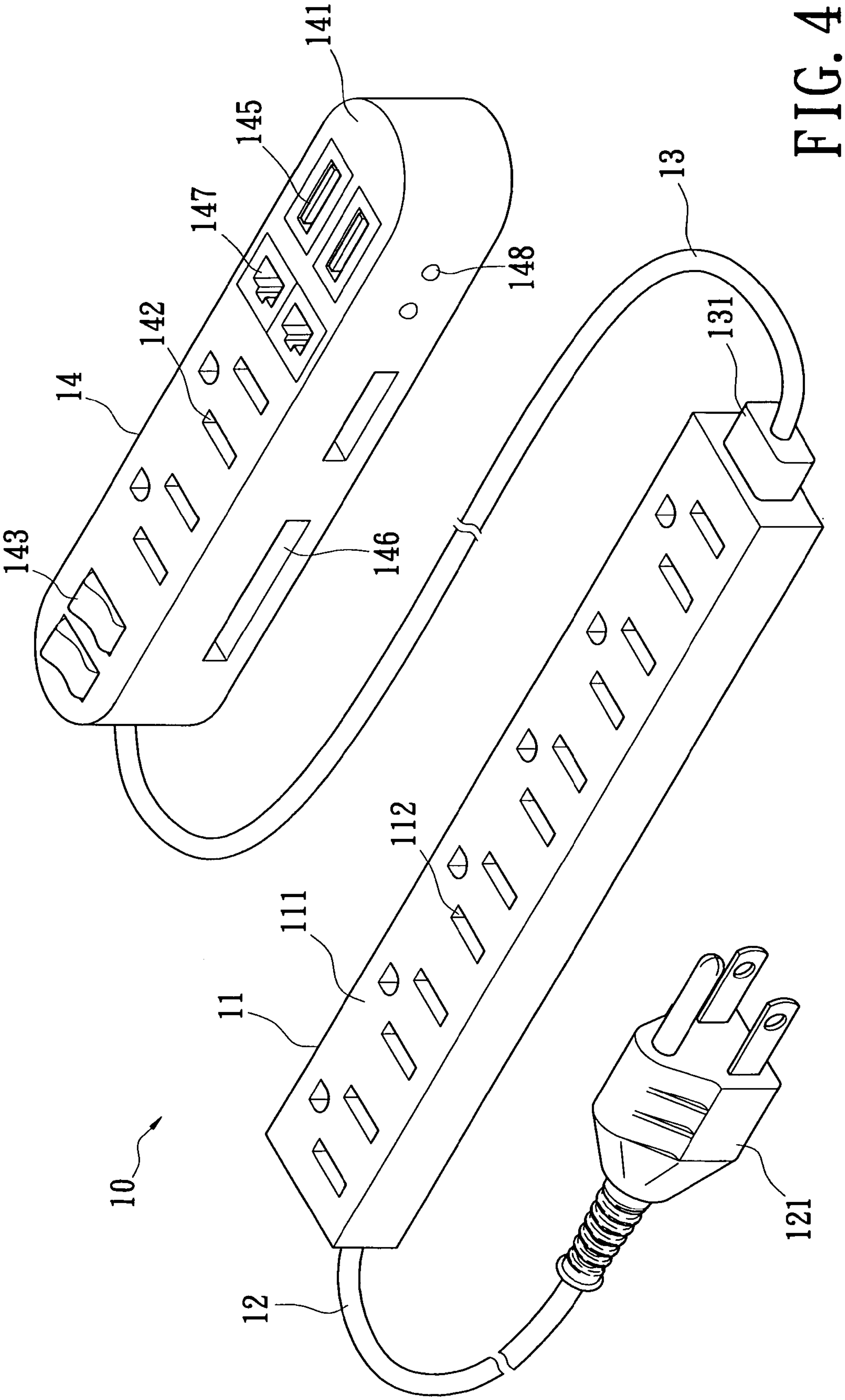
FIG. 4 is a 3D view of the remote control duo power set in a second embodiment of this invention.
Figure 5:
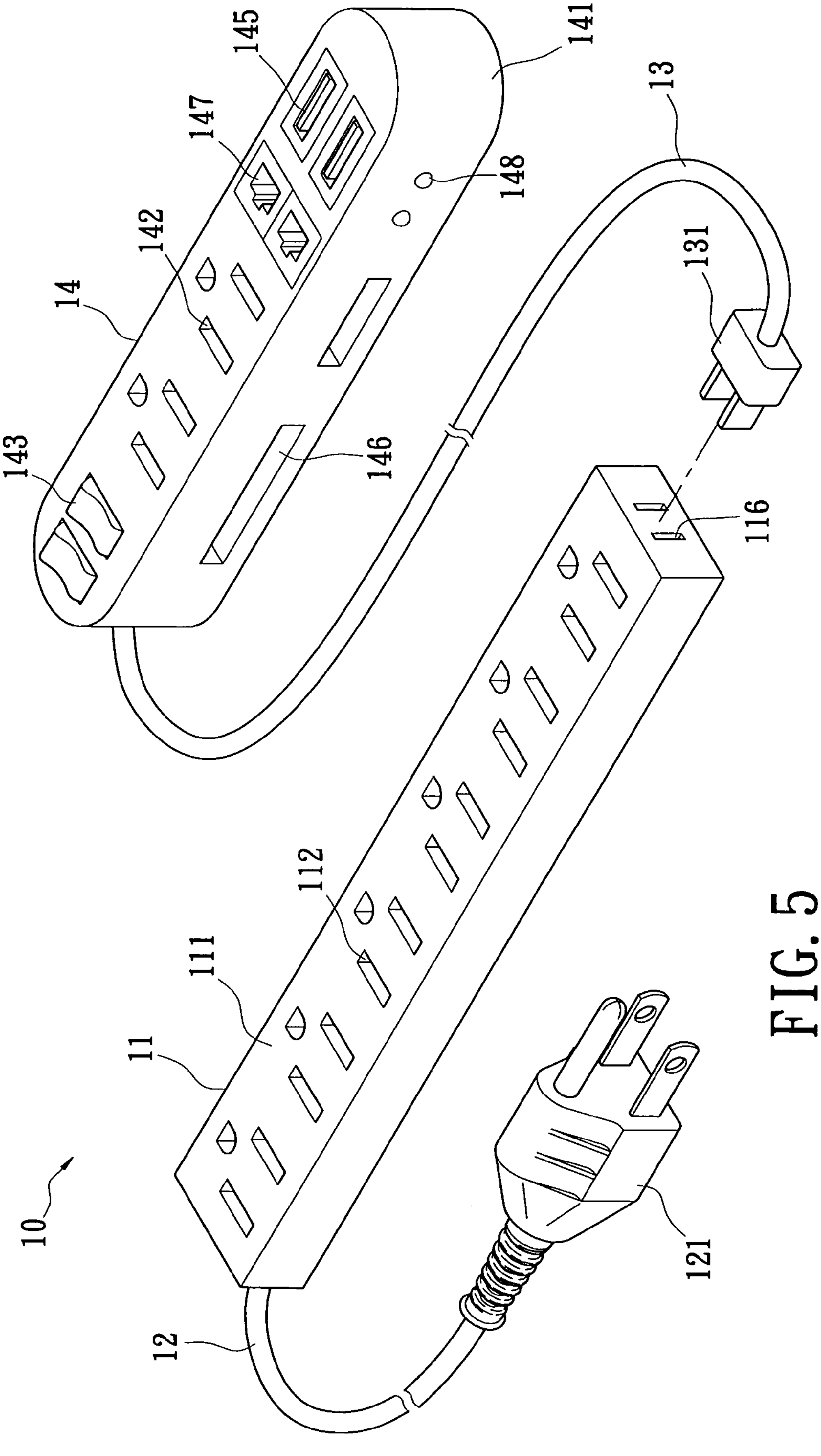
FIG. 5 is an exploded view of the remote control duo power set in the second embodiment of this invention.

With reference to FIGS. 4 and 5 illustrating the remote control duo power set 10 in a second embodiment of this invention, reference numbers of components are identical to those in the first embodiment. What is in the embodiment is different from what is in the above-mentioned embodiment in that one end of the connecting cord 13 is fixed and connected to the second power outlet 14 and the other end is detachably connected to the first power outlet 11. Concretely, one end of the connecting cord 13 is formed with a connecting cord plug 131, one surface of the first housing 11 is formed with a connecting cord socket 116, and the connecting cord plug 131 may be inserted into or pulled from the connecting cord socket 116. Thus, the first power outlet 11 and the second power outlet 14 may be used separately to prevent the two outlets from being incapable when one of the outlets is damaged.

Figure 6:
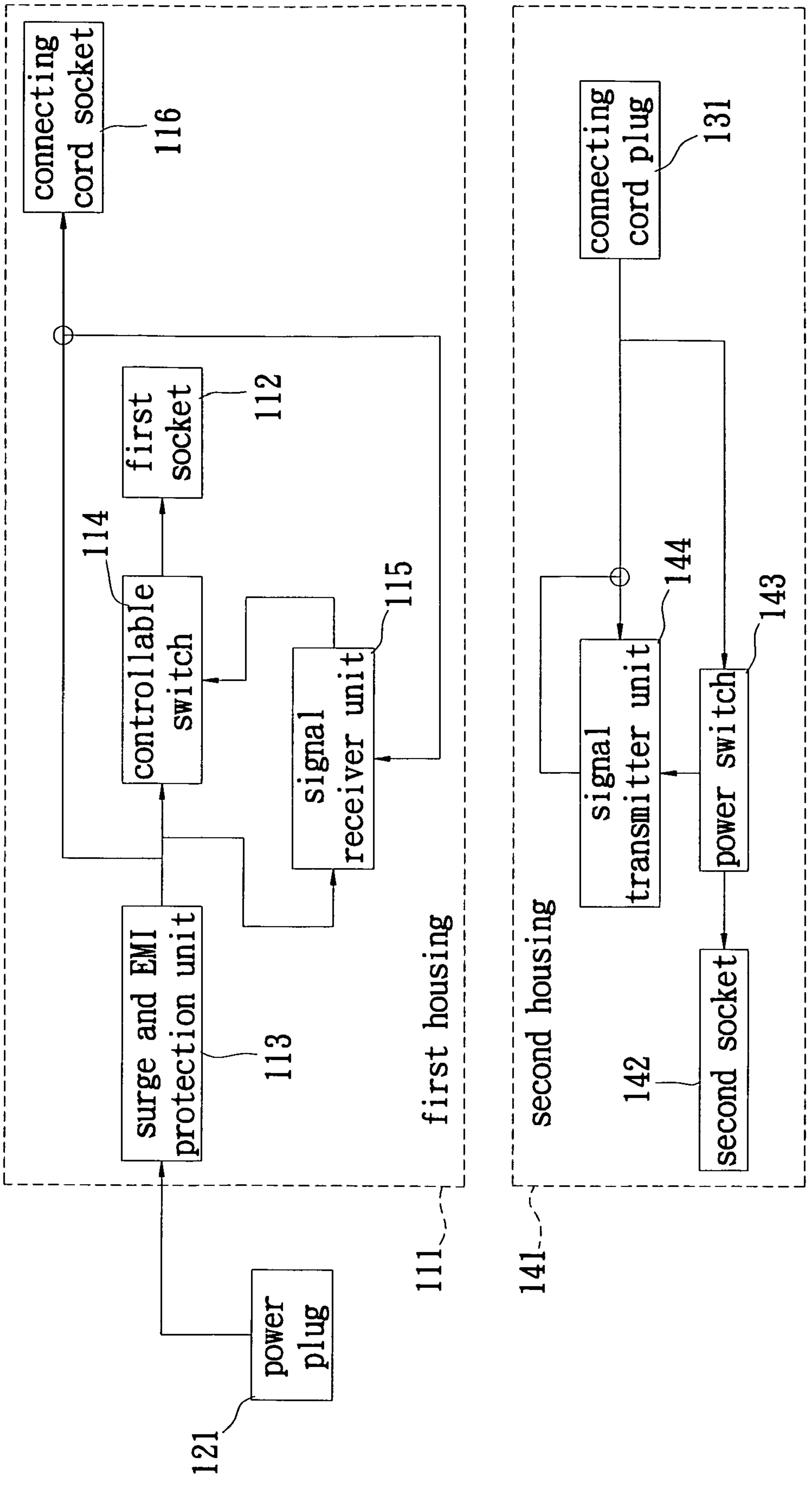
FIG. 6 is a circuit diagram of the remote control duo power set in the second embodiment of this invention.

With reference to FIG. 6 illustrating the remote control duo power set 10 in the second embodiment of this invention, what is in the embodiment is different from what is in the first embodiment regarding the circuit in that only when the connecting cord plug 131 is plugged into the connecting cord socket 116, the first power outlet 11 is electrically connected to the second power outlet 14, the power is then transmitted from the first power outlet 11 to the second power outlet 14, and the power switch 143 thus may control the controllable switch 114 being open or closed.

Figure 7:
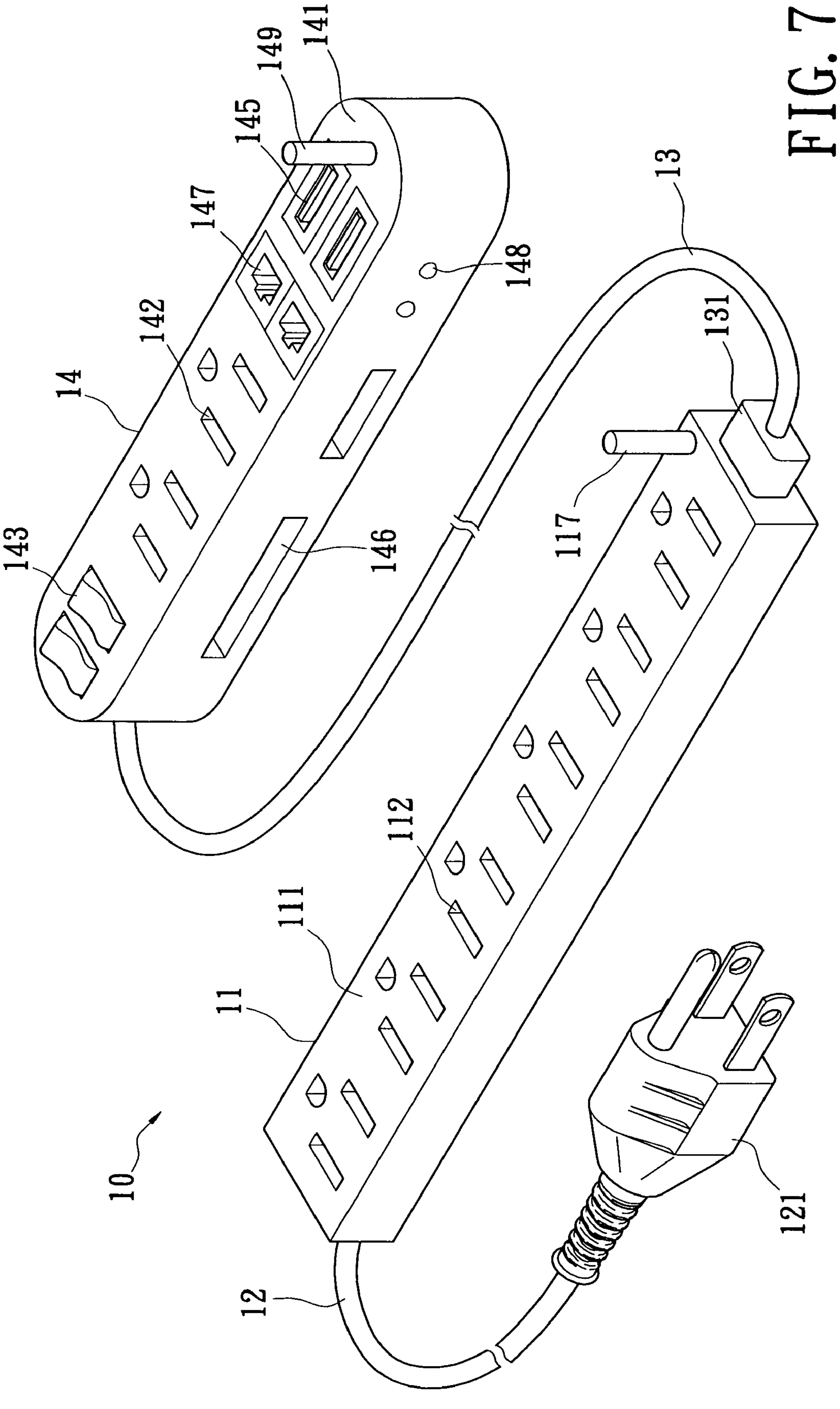
FIG. 7 is a 3D view of the remote control duo power set in a third embodiment of this invention.

With reference to FIG. 7 illustrating the remote control duo power set 10 in a third embodiment of this invention, what is in the embodiment is different from what is in the second embodiment in that a first antenna 117 is provided on one surface of the first housing 111 and a second antenna 149 is provided on one surface of the second housing 141. The antennae 117 and 149 are electrically connected to each other. Thus, the power switch 143 of second power outlet 14 may control the first power socket 112 supplying power in the manner of wireless transmission of radio frequency (RF), blue tooth and the like. In the embodiment, the antennae 117 and 149 are exposed and may also be designed into embedded antennae, indicating that the antennae 117 and 149 may be respectively embedded into the first housing 111 and the second housing 141 (not shown).

Figure 8:
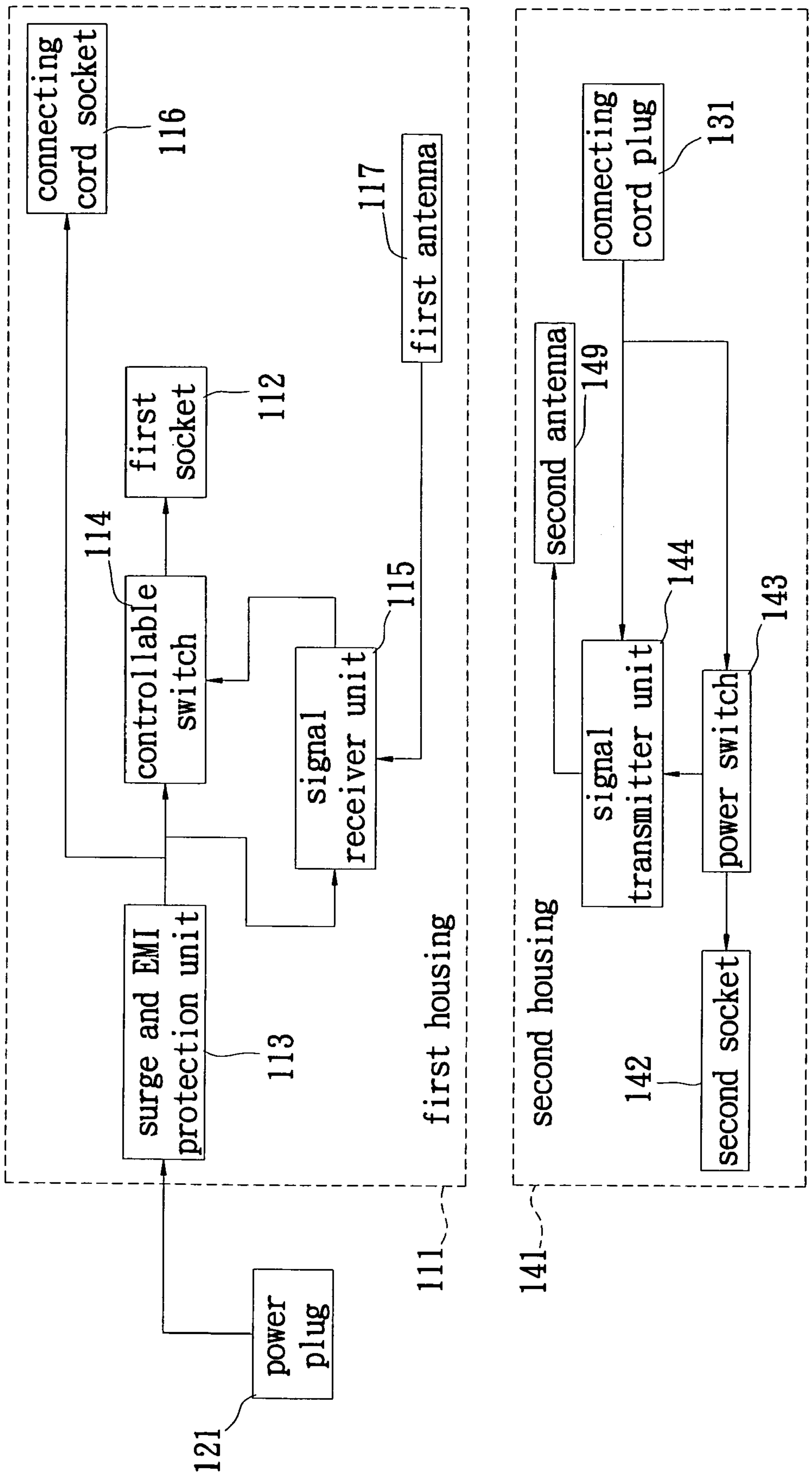
FIG. 8 is a circuit diagram of the remote control duo power set in the third embodiment of this invention.

With reference to FIG. 8 illustrating the remote control duo power set 10 in the third embodiment of this invention, what is in the embodiment is different from what is in the second embodiment in that the signal transmitter unit 144 is electrically connected to the second antenna 149 and may encode the signal into a radio wave and then transmit it through the second antenna 149.

The signal receiver unit 115 is electrically connected to the first antenna 117. After the first antenna 117 receives the radio wave, the signal receiver unit 115 decodes the radio wave into a signal and determines to open or close the controllable switch 114, depending on information on the signal.

Figure 9:
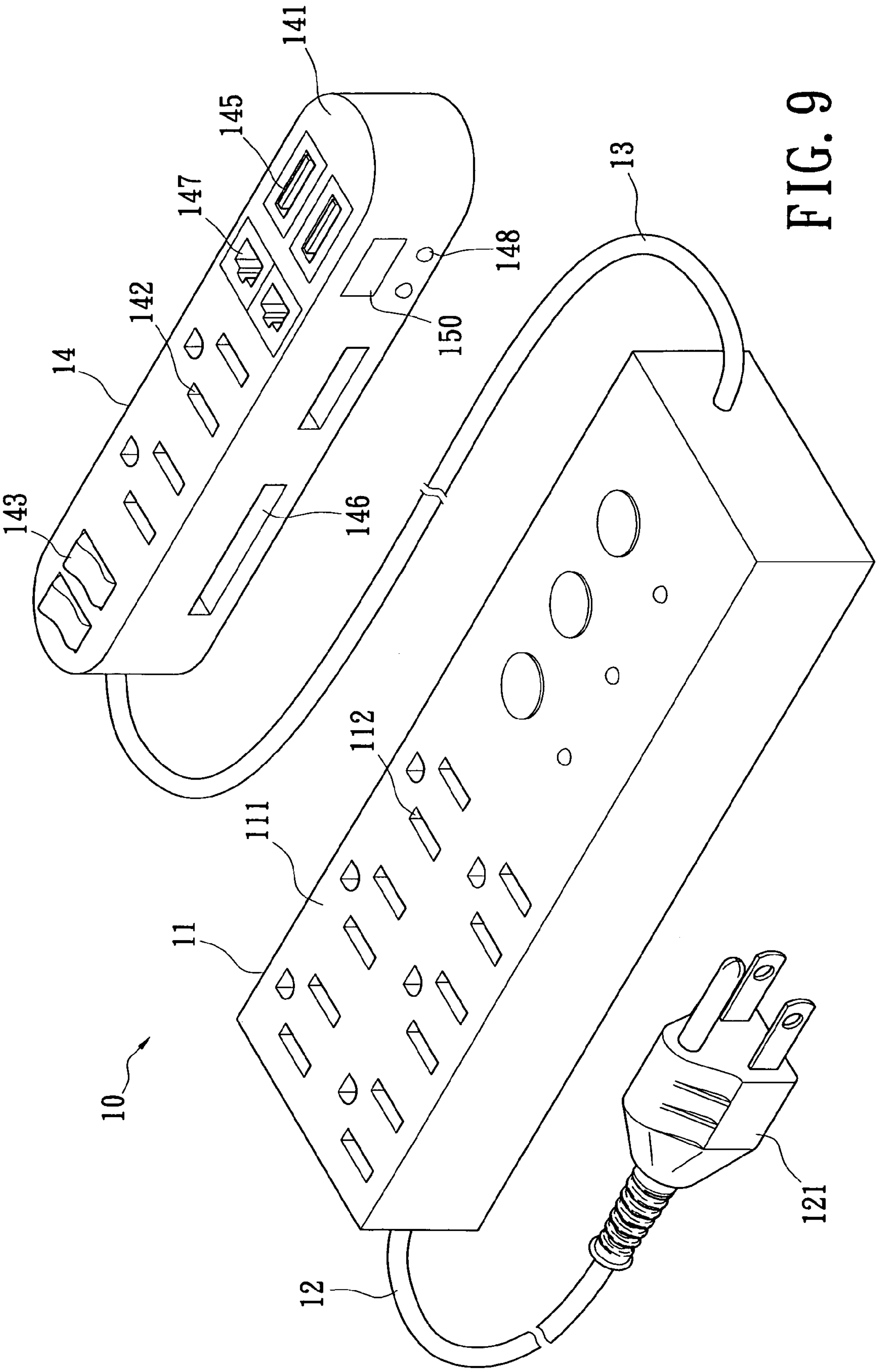
FIG. 9 is a 3D view of the remote control duo power set in a fourth embodiment of this invention.

With reference to FIG. 9 illustrating the remote control duo power set 10 in a fourth embodiment of this invention, what is in the embodiment is different from what is in the first embodiment in that the first power outlet 11 is a power outlet provided with an uninterruptible power supply (UPS) and an UPS module is provided in the first housing 111 to uninterruptedly supply standby power in a condition of abnormal external power supply (power failure, insufficient voltage, EMI or surge current) so as to keep the electronic devices the power cords of which are plugged into the first socket 112 and second socket 142 normally working. An UPS status indicator 150 is further provided in the second housing 141 of the second power outlet 14 so that the user may easily check the operation status of UPS module in the first power outlet 11.

Figure 10:
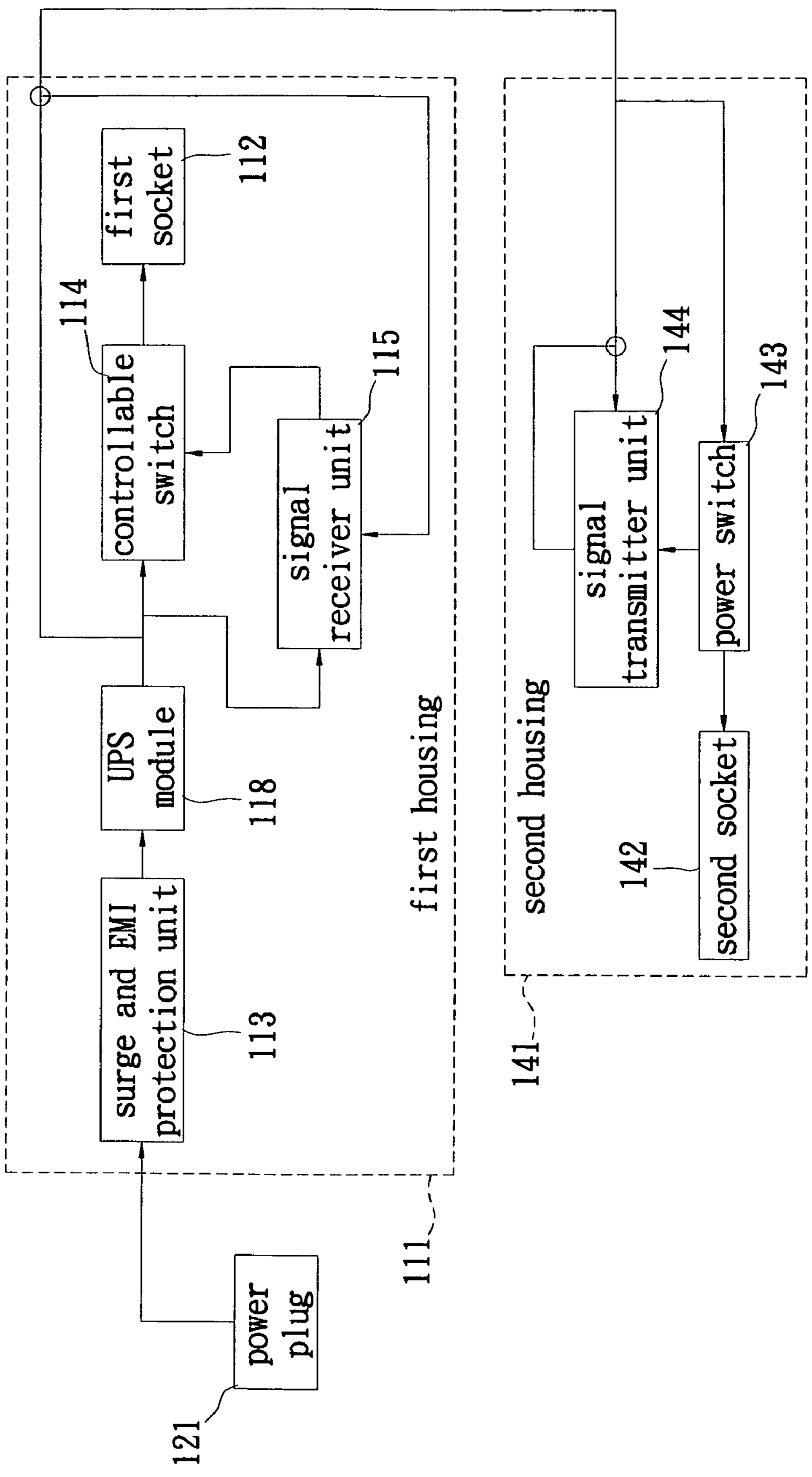
FIG. 10 is a circuit diagram of the remote control duo power set in the fourth embodiment of this invention.

With reference to FIG. 10 illustrating the remote control duo power set 10 in the fourth embodiment of this invention, a back terminal of the surge and EMI protection unit 113 is electrically connected to the UPS module 118 and the power is transmitted to the rests of components through the UPS module 118.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A remote control duo power set, comprising:

a first power outlet which has a first housing, a surface of which is formed with a plurality of first sockets;

a power cord extending from one of two ends of the first housing, with a power plug provided at an end of the power cord;

a connecting cord, one end of which is connected to the other end of the first housing; and a second power outlet connected to the other end of the connecting cord, in which the second power outlet has a second housing, a surface of which is formed with a plurality of second sockets and a first power switch and a second power switch;

wherein the first power switch is used to control the power supplied by the first sockets, and the second power switch is used to control the power supplied by the second sockets.

2. The remote control duo power set according to claim 1, wherein the first power outlet is electrically connected to the second power outlet.

3. The remote control duo power set according to claim 1, wherein a memory card slot is provided on a surface of the second housing.

4. The remote control duo power set according to claim 1, wherein a Universal Serial Bus (USB) slot is provided on a surface of the second housing.

5. The remote control duo power set according to claim 1, wherein a network line jack is provided on a surface of the second housing.

6. The remote control duo power set according to claim 1, wherein an indicating lamp is provided on a surface of the second housing.

7. The remote control duo power set according to claim 1, wherein one end of the connecting cord is formed with a connecting cord plug, one surface of the first housing is formed with a connecting cord socket, and the connecting cord plug is inserted into the connecting cord socket.

8. The remote control duo power set according to claim 1, wherein a first antenna is provided on one surface of the first housing, a second antenna is provided on one surface of the second housing, and the first antenna is electrically connected to the second antenna.

9. The remote control duo power set according to claim 1, wherein the first power outlet is provided with a UPS module and a surface of the second housing is formed with a UPS status indicator.

* * * * *